United States Patent
Miyamoto et al.

(10) Patent No.: US 12,017,428 B2
(45) Date of Patent: Jun. 25, 2024

(54) MOTION SETTING METHOD FOR TRANSFER PRESS AND TRANSFER PRESS

(71) Applicant: AIDA ENGINEERING, LTD., Kanagawa (JP)

(72) Inventors: Isao Miyamoto, Sagamihara (JP); Sotoyuki Kaneko, Sagamihara (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 528 days.

(21) Appl. No.: 17/338,416

(22) Filed: Jun. 3, 2021

(65) Prior Publication Data
US 2021/0387434 A1    Dec. 16, 2021

(30) Foreign Application Priority Data

Jun. 11, 2020    (JP) .................................. 2020-101451

(51) Int. Cl.
*G05B 19/418*    (2006.01)
*B21D 43/04*    (2006.01)
(Continued)

(52) U.S. Cl.
CPC .............. *B30B 15/14* (2013.01); *B21D 43/04* (2013.01); *B30B 15/30* (2013.01); *G05B 19/41815* (2013.01); *G05B 2219/45142* (2013.01)

(58) Field of Classification Search
CPC ....... B30B 15/14; B30B 15/30; B30B 15/148; B30B 15/32; B30B 15/26; B21D 43/04;
(Continued)

(56) References Cited

U.S. PATENT DOCUMENTS

2013/0104613 A1* 5/2013 Kaneko ................. B30B 15/148
72/20.5

FOREIGN PATENT DOCUMENTS

EP    1820580 B1    7/2011
JP    2003-019527 A    1/2003
(Continued)

OTHER PUBLICATIONS

Japanese Office Action issued in Japanese Application No. 2020-101451, dated Apr. 4, 2023, with English Translation.
(Continued)

*Primary Examiner* — Yuhui R Pan
(74) *Attorney, Agent, or Firm* — Rimon P.C.

(57) ABSTRACT

A transfer press includes a press machine that moves a slide up and down in accordance with pressing motion, and a transport device that moves a retainer in accordance with transfer motion to transport a workpiece. The transfer press includes a creation unit, a determination unit, and a phase adjustment unit. The creation unit creates a three-dimensional operating curved surface based on the provisionally set pressing motion and the provisionally set transfer motion. The determination unit compares a standard upper die interference curved surface with the operating curved surface in the same three-dimensional coordinate system to determine whether the operating curved surface is present within an interference region of the standard upper die interference curved surface. The phase adjustment unit changes a relative phase of the transfer motion relative to the pressing motion when the operating curved surface is present within the interference region.

9 Claims, 12 Drawing Sheets

(51) Int. Cl.
*B30B 15/14* (2006.01)
*B30B 15/30* (2006.01)

(58) Field of Classification Search
CPC .................. B21D 43/055; B21D 22/02; G05B 19/41815; G05B 2219/45142
See application file for complete search history.

(56) References Cited

FOREIGN PATENT DOCUMENTS

| | | |
|---|---|---|
| JP | 2006-122986 A | 5/2006 |
| JP | 2013-91078 A | 5/2013 |

OTHER PUBLICATIONS

Extended European Search Report issued in EP Application No. 21178446.7, dated Nov. 9, 2021.

* cited by examiner

MOTION SETTING METHOD FOR TRANSFER PRESS AND TRANSFER PRESS

CROSS-REFERENCE TO RELATED APPLICATION

Japanese patent application No. 2020-101451, filed on Jun. 11, 2020, is hereby incorporated by reference in its entirety.

BACKGROUND

The present invention relates to a motion setting method for a transfer press and a transfer press.

The transfer press is composed of a press machine that performs stamping and a transport device that transports a workpiece (material). The press machine has a plurality of stamping stations and uses a die to perform stamping (punching, bending, drawing, and the like) on the workpiece while moving a slide up and down. The slide is moved up and down in accordance with pressing motion.

One transport device (in some cases, referred to as a "transfer feeder") holds the workpiece with a retainer (finger, cup, and the like) provided at a feed bar, and moves the feed bar in a two-dimensional or three-dimensional direction to transport the workpiece to each stamping station.

In the transfer press, there is a need to synchronize the press machine and the transport device to perform efficient processing and to prevent interference with each other. In recent years, a servo motor has been used as a drive source of a press machine and a transport device, and there is a demand for improved productivity by high SPM (Stroke Per Minutes) and improved processing accuracy due to complicated operations. In a conventional mechanical press, the transport device is fully synchronized to a crank angle of the press machine, however, in the press machine and transport device in which the servo motor are used, interference with each other due to complex changes in pressing motion and transfer motion must be prevented.

Therefore, a transfer press has been proposed in which a relative relationship of phase signals is adjusted so as not to cause an interference by creating a reference interference line diagram representing an interference presence/absence relationship between a press machine and a transfer device using reference pressing motion and reference transfer motion, and comparing the reference interference line diagram with an operational interference line diagram created using operation pressing motion and operation transfer motion that are input before operation to determine the presence/absence of interference (JP 2013-91078 A).

In the transfer press described in JP 2013-91078 A, in comparing the reference interference line diagram with the operational interference line diagram, two line diagrams are each arranged in a two-dimensional coordinate system. In one line diagram, a transfer feed stroke (distance) is taken as a horizontal axis, and a distance obtained by subtracting a transfer lift stroke from a slide stroke is taken as a vertical axis, while in another line diagram, a transfer clamp stroke (distance) is taken as a horizontal axis, and a distance obtained by subtracting a transfer lift stroke from a slide stroke is taken as a vertical axis. Then, when the operational interference line diagram enters in a plane (interference region) surrounded by the reference interference line diagram, it is determined that interference occurs.

However, since any interference line diagrams are represented in the two-dimensional coordinate system, when the transfer press is actually operated, it may be determined that interference occurs even in motion that does not actually interfere. Furthermore, in recent years, there has been a demand for further improvement in production efficiency with respect to the transfer press.

SUMMARY

The present disclosure can provide a motion setting method for a transfer press and a transfer press that can improve production efficiency.

According to a first aspect of the invention, there is provided a motion setting method for a transfer press including a press machine configured to move a slide up and down in accordance with pressing motion and a transport device configured to move a retainer in accordance with transfer motion to transport a workpiece, the method including the steps of:

creating, based on the pressing motion provisionally set and the transfer motion provisionally set, an operating curved surface which has been made three-dimensional based on a relative distance of the retainer relative to a standard upper die attached to the slide;

determining, by comparing a standard upper die interference curved surface with the operating curved surface that are placed in the same three-dimensional coordinate system, whether the operating, curved surface is present within an interference region of the standard upper die interference curved surface, the standard upper die interference curved surface having been obtained by making a standard upper die interference curve three-dimensional; and when the operating curved surface is determined to be present within the interference region in the determining step, changing a relative phase of the transfer motion relative to the pressing motion, after the changing step, the determining step being performed again by comparing the standard upper die interference curved surface with the operating curved surface having the relative phase changed.

According to a second aspect of the invention, there is provided a transfer press including:

a press machine configured to move a slide up and down in accordance with pressing motion;

a transport device configured to move a retainer in accordance with transfer motion to transport a workpiece; and a control device, wherein the control device is configured to:

perform a process to create, based on the pressing motion provisionally set and the transfer motion provisionally set, an operating curved surface which has been made three-dimensional based on a relative distance of the retainer to a standard upper die attached to the slide;

perform a process to determine, by placing a standard upper die interference curved surface and the operating curved surface in the same three-dimensional coordinate system, whether the operating curved surface is present within an interference region of the standard upper die interference curved surface, the standard upper die interference curved surface having been obtained by making a standard upper die interference curve three-dimensional; and when the operating curved surface is present within the interference region, perform a process to change a relative phase of the transfer motion relative to the pressing motion.

DETAILED DESCRIPTION OF EMBODIMENTS

Figure 1:
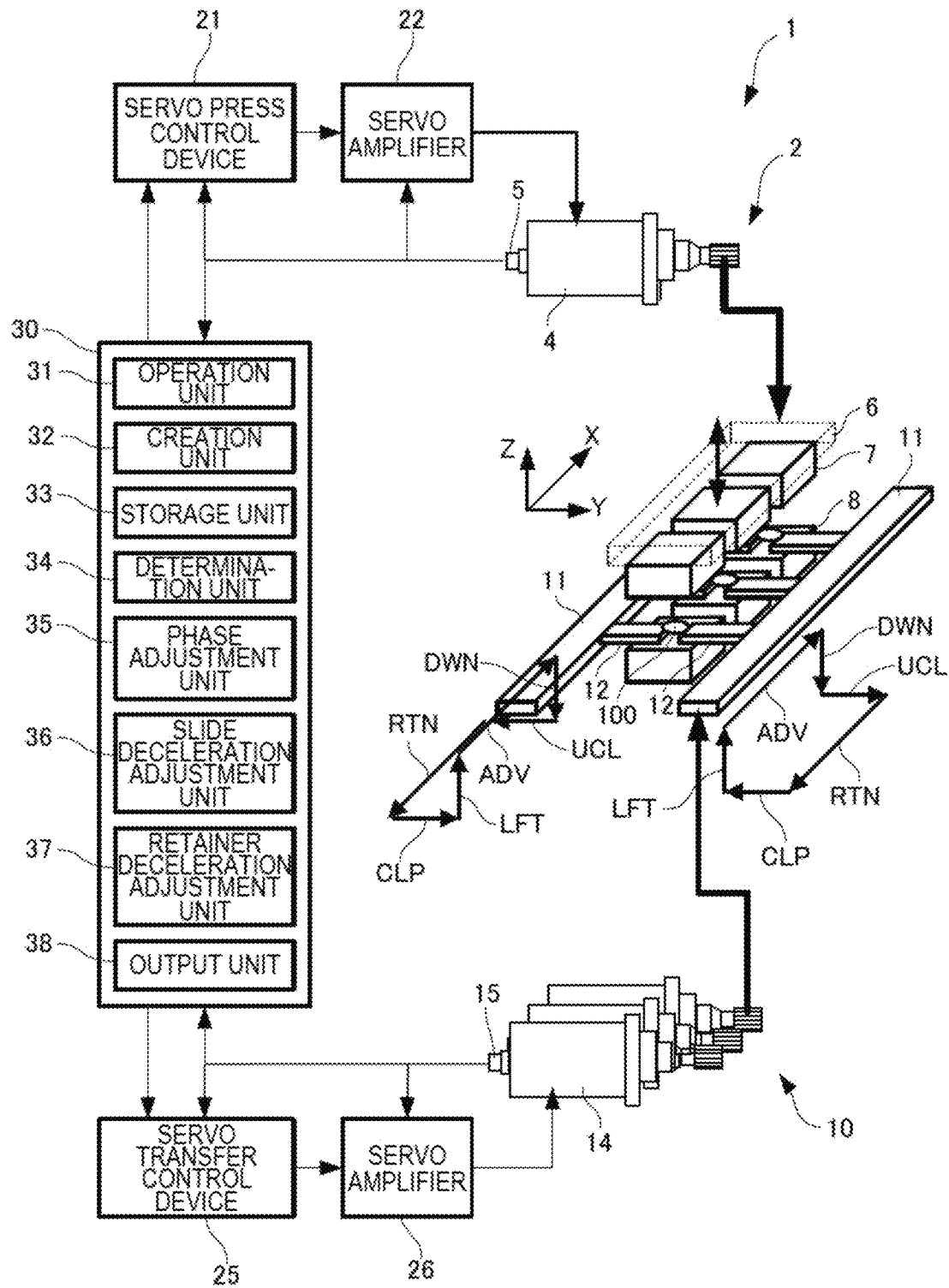
FIG. 1 is a schematic diagram of a transfer press according to an embodiment of the invention.

The invention has been made to solve at least part of the above problems, and can be implemented as the aspects or application examples described below.

(1) One aspect of a motion setting method for a transfer press according to the invention is
  a motion setting method for a transfer press including a press machine configured to move a slide up and down in accordance with pressing motion and a transport device configured to move a retainer in accordance with transfer motion to transport a workpiece, the method including the steps of:
  creating, based on the pressing motion provisionally set and the transfer motion provisionally set, an operating curved surface which has been made three-dimensional based on a relative distance of the retainer relative to a standard upper die attached to the slide;
  determining, by comparing a standard upper die interference curved surface with the operating curved surface that are placed in a same three-dimensional coordinate system, whether the operating curved surface is present within an interference region of the standard upper die interference curved surface, the standard upper die interference curved surface having been obtained by making a standard upper die interference curve three-dimensional; and
  when the operating curved surface is determined to be present within the interference region in the determining step, changing a relative phase of the transfer motion relative to the pressing motion,
  after the changing step, the determining step being performed again by comparing the standard upper die interference curved surface with the operating curved surface having the relative phase changed.

(2) In the above aspect of the motion setting method for a transfer press,
  each of the changing step and the determining step may be repeated two or more times within an adjustment allowable range of the relative phase.

(3) In the above aspect of the motion setting method for the transfer press,
  when the relative phase in the changing step exceeds the adjustment allowable range, the determining step and the changing step may be performed after returning the state of the relative phase to a provisionally set state and performing adjustment for decelerating the provisionally set pressing motion when reaching a vicinity of an upper motion limit of the slide.

(4) In the above aspect of the motion setting method of the transfer press,
  when the relative phase in the changing step exceeds the adjustment allowable range, the determining step and the changing step may be performed after returning the state of the relative phase to a provisionally set state and performing adjustment for decelerating the provisionally set transfer motion in a return operation of the retainer.

(5) One aspect of a transfer press according to the invention is
  a transfer press including:
  a press machine configured to move a slide up and down in accordance with pressing motion:
  a transport device configured to move a retainer in accordance with transfer motion to transport a workpiece; and
  a control device,
  the control device is configured to:
  creating, based on the pressing motion provisionally set and the transfer motion provisionally set, an operating curved surface which has been made three-dimensional based on a relative distance of the retainer relative to a standard upper die attached to the slide;
  perform a process to determine, by placing a standard upper die interference curved surface and the operating curved surface in a same three-dimensional coordinate system, whether the operating curved surface is present within an interference region of the standard upper die interference curved surface, the standard upper die interference curved surface having been obtained by making a standard upper die interference curve three-dimensional; and
  when the operating curved surface is present within the interference region, perform a process to change a relative phase of the transfer motion relative to the pressing motion.

(6) In the above aspect of the transfer press,
  when the operating curved surface is present within the interference region, the control device may perform a process to decelerate the provisionally set pressing motion when reaching a vicinity of an upper motion limit of the slide.

(7) In the above aspect of the transfer press,
  when the operating curved surface is present within the interference region, the control device may perform a process to decelerate the provisionally set transfer motion in a return operation of the retainer.

According to the motion setting method for a transfer press and the transfer press according to the present disclosure, the production efficiency can be improved by determining a detailed interference occurrence position in a three-dimensional coordinate system and further changing a relative phase having less influence on production efficiency.

Preferred embodiments of the invention are described in detail below with reference to the drawings. It is noted that the following embodiments do not unduly limit the scope of the invention as stated in the claims. In addition, all of the components described in the following embodiments are not necessarily essential requirements of the invention.

According to an embodiment of the invention, there is provided a transfer press including a press machine configured to move a slide up and down in accordance with pressing motion, and a transport device configured to move a retainer in accordance with transfer motion to transport a workpiece, the transfer press including:

a creation unit configured to create, based on the pressing motion provisionally set and the transfer motion provisionally set, an operating curved surface which has been made three-dimensional based on a relative distance of the retainer relative to a standard upper die attached to the slide;

a determination unit configured to determine, by placing a standard upper die interference curved surface and the operating curved surface in a same three-dimensional coordinate system, whether the operating curved surface is present within an interference region of the standard upper die interference curved surface, the standard upper die interference curved surface having been obtained by making an upper die interference curve three-dimensional; and when the operating curved surface is present within the interference region, a phase adjustment unit configured to change a relative phase of the transfer motion relative to the pressing motion.

According to an embodiment of the invention, there is provided a motion setting method for a transfer press including a press machine configured to move a slide up and down in accordance with pressing motion and a transport device configured to move a retainer in accordance with transfer motion to transport a workpiece, the motion setting method including the steps of:

creating, based on the pressing motion provisionally set and the transfer motion provisionally set, an operating curved surface which has been made three-dimensional based on a relative distance of the retainer relative to a standard upper die attached to the slide;

determining, by comparing a standard upper die interference curved surface with the operating curved surface in a same three-dimensional coordinate system, whether the operating curved surface is present within an interference region of the standard upper die interference curved surface, the standard upper die interference curved surface having been obtained by making a standard upper die interference curve three-dimensional; and when the operating curved surface is determined to be present within the interference region in the determining step, changing a relative phase of the transfer motion relative to the pressing motion, after the changing step, the determining step being performed again by comparing the standard upper die interference curved surface with the operating curved surface having the relative phase changed.

1. Transfer Press

Figure 2:
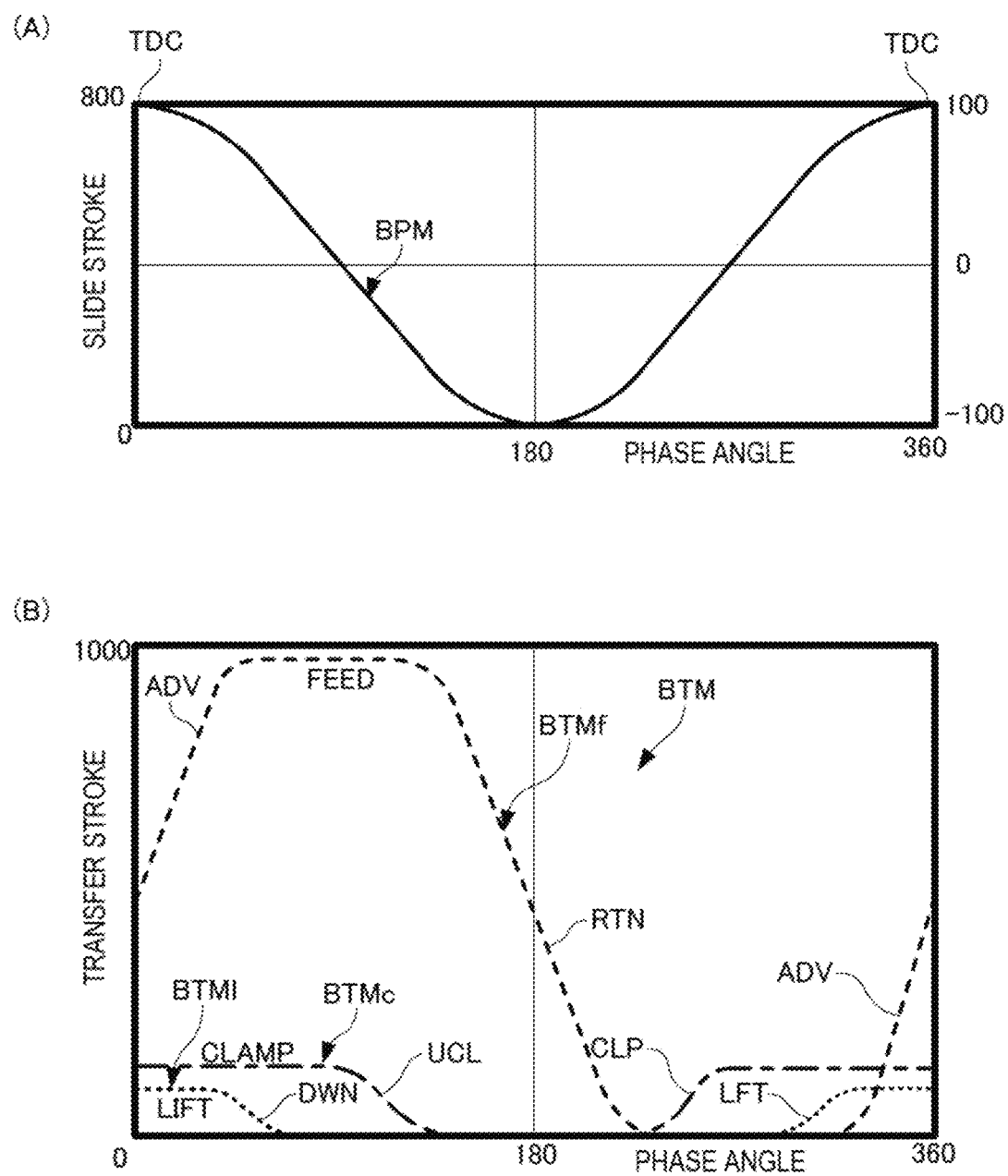
FIG. 2 is a diagram illustrating standard pressing motion and standard transfer motion.
Figure 3:
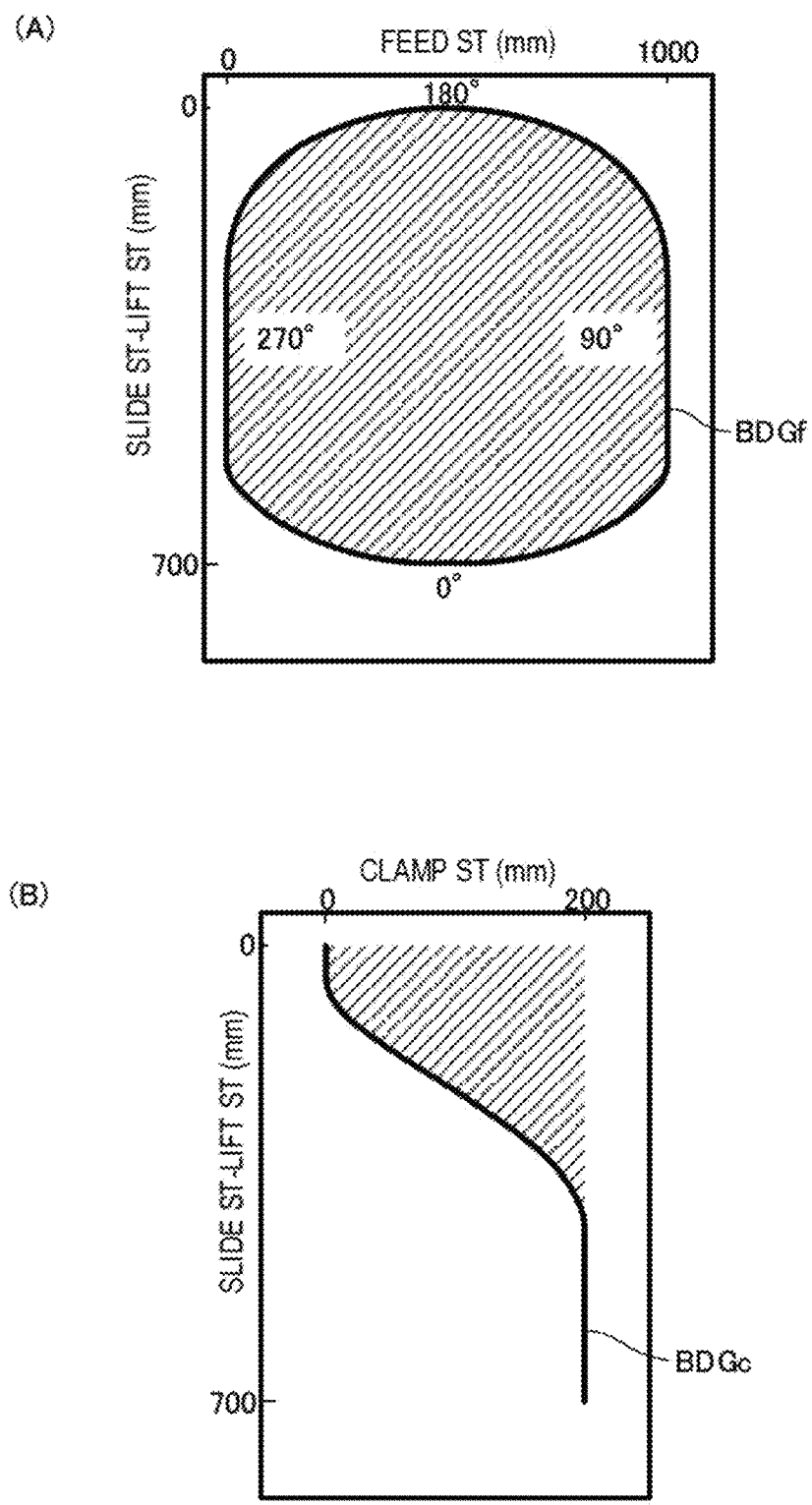
FIG. 3 is a standard upper die interference curve placed in a two-dimensional coordinate system.
Figure 4:
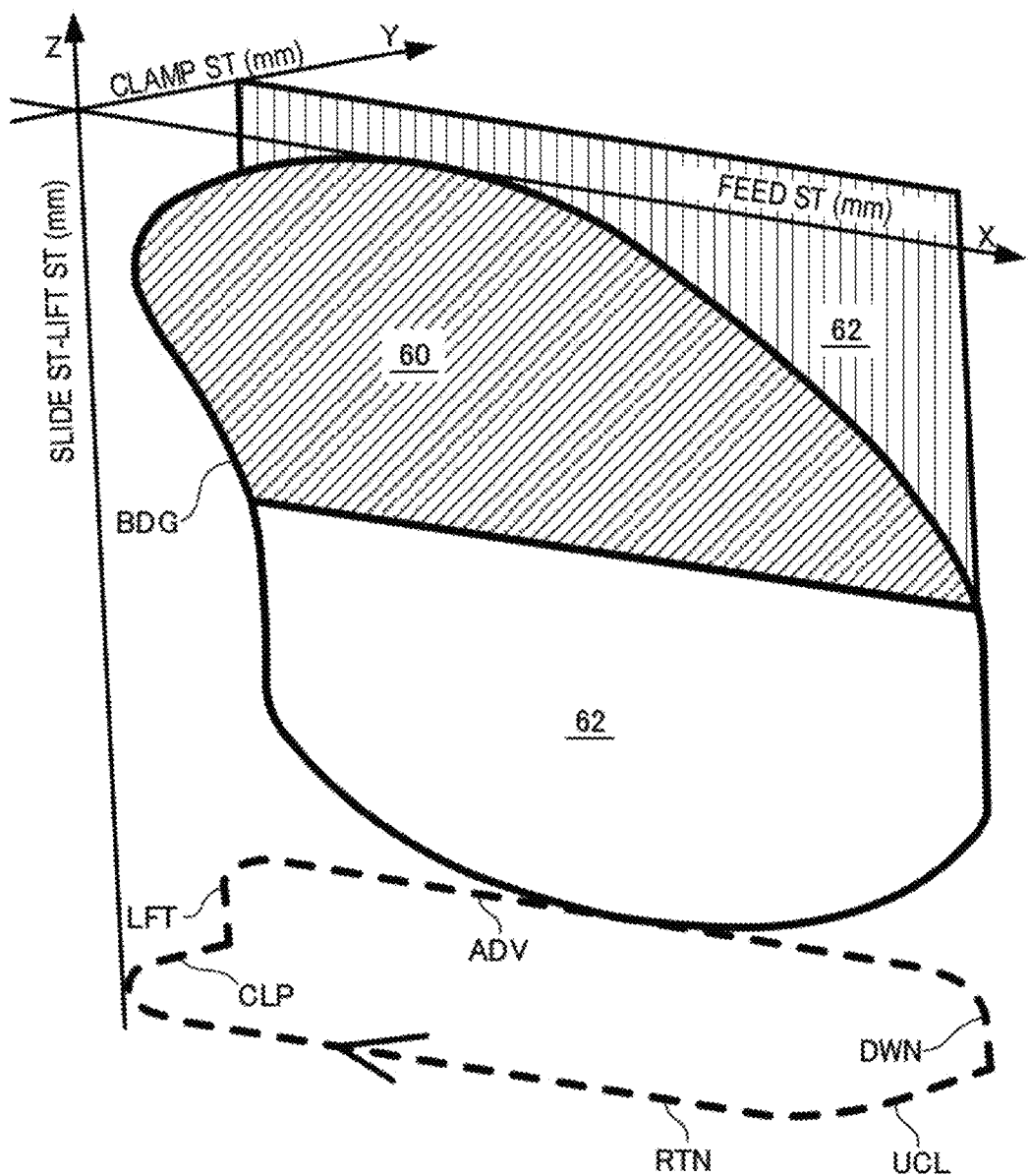
FIG. 4 is a standard upper die interference curved surface placed in a three-dimensional coordinate system.

Referring to FIGS. 1 to 4, a transfer press 1 will be described in detail. FIG. 1 is a schematic diagram of the transfer press 1 according to an embodiment of the invention. FIG. 2 is a diagram illustrating a standard pressing motion BPM and standard transfer motion BTM. FIG. 3 indicate standard upper die interference curves BDGf and BDGc placed in a two-dimensional coordinate system. FIG. 4 is a standard upper die interference curved surface 60 placed in a three-dimensional coordinate system.

As illustrated in FIG. 1, the transfer press 1 includes a press machine 2 that moves a slide 6 up and down in accordance with pressing motion, a transport device 10 that moves a retainer 12 in accordance with transfer motion to transport a workpiece 100, and a transfer press control device 30.

The press machine 2 includes the slide 6 that can be moved up and down by a servo motor 4, an upper die 7 attached to the lower face of the slide 6, a lower die 8 facing the upper die 7, a bolster (not illustrated) that fixes the lower die 8, and a servo press control device 21. The press machine 2 performs stamping on the workpiece 100 by moving the upper die 7 up and down relative to the lower die 8 via a power transmission mechanism (not illustrated) by driving the servo motor 4 in accordance with the set pressing motion. In the press machine 2, a known servo press machine used in a transfer press can be used.

The servo motor 4 is provided with an encoder 5. For control in accordance with pressing motion, a detection signal from the encoder 5 is input to the servo press control device 21, a servo amplifier 22, and a transfer press control device 30. Also, although not illustrated, the press machine 2 may include an encoder that detects a height position of the slide 6.

The transport device 10 includes a feed bar 11 driven by a plurality of the servo motors 14, a retainer 12 attached to the feed bar 11, and a servo transfer control device 25. A pair of the feed bars 11 and a pair of the retainers 12 are provided across the lower die 8. Each feed bar 11 includes a plurality of the retainers 12. The retainers 12 have, for example, a finger, a vacuum cup, and the like as a mechanism for holding the workpiece 100. The transport device 10 drives the plurality of servo motors 14 in accordance with the set transfer motion to move the retainers 12 with a clamping operation CLP, a lift operation LFT, an advance operation ADV, a down operation DWN, an unclamped operation UCL, and a return operation RTN, as indicated by arrows in FIG. 1.

The clamping operation CLP is an operation in which the opposing retainers 12 approach each other such that the retainers 12 hold the workpiece 100 on the lower die 8. The lift operation LFT is an operation of moving the retainers 12 upward to release the workpiece 100 from the lower die 8. The advance operation ADV is an operation of moving the retainers 12 along a longitudinal direction of the feed bars 11 (in a direction along the X axis) to move the workpiece 100 onto the next lower die 8. The down operation DWN is an operation of lowering the retainers 12 to mount the workpiece 100 onto the lower die 8. The unclamped operation UCL is an operation in which the opposing retainers 12 are moved apart from each other such that the retainers 12 release the workpiece 100. The return operation RTN is an operation of moving the retainers 12 along the longitudinal direction of the feed bars 11 at positions that do not interfere with the upper die 7 and returning the retainers 12 to initial positions.

The servo motor 14 is also provided with an encoder 15. For control in accordance with the transfer motion, the detection signal from the encoder 15 is input to the servo transfer control device 25, the servo amplifier 26, and the transfer press control device 30. The transport device 10 may also include a plurality of encoders (not illustrated) that detect the positions of the retainers 12 and the feed bars 11.

The transfer press control device 30 includes, for example, an operation unit 31, a creation unit 32, a storage unit 33, a determination unit 34, a phase adjustment unit 35, a slide deceleration adjustment unit 36, a retainer deceleration adjustment unit 37, and an output unit 38. The transfer press control device 30 includes a processor such as a CPU (Central Processing Unit) or a GPU (Graphics Processing Unit), a ROM (Read Only Memory), a RAM (Random Access Memory), a storage medium such as a HDD (Hard Disk Drive), a communication interface for high speed data communication, and a user interface such as a display, a touch panel, a keyboard, and the like.

The operation unit 31 is an interface for an operator to input various conditions of the pressing motion and transfer motion. The creation unit 32 creates, based on provisionally set pressing motion and provisionally set transfer motion by the input from the operation unit 31, a three-dimensional operating curved surface based on a relative distance of the retainers 12 to a standard upper die attached to the slide 6. The storage unit 33 stores the pressing motion, transfer motion, standard upper die interference curved surface, operating curved surface, various control program, etc. The determination unit 34 determines, by placing the standard upper die interference curved surface that is a three-dimensional standard upper die interference curve and the operating curved surface in the same three-dimensional coordinate system, whether the operating curved surface is present within an interference region of the standard upper die interference curved surface. When the operating curved surface is present within the interference region, the phase adjustment unit 35 changes the relative phase of the transfer motion with respect to the pressing motion. When the operating curved surface is present within the interference region, the slide deceleration adjustment unit 36 decelerates the provisionally set pressing motion at the near upper motion limit of the slide 6. When the operating curved surface is present within the interference region, the retainer deceleration adjustment unit 37 decelerates the provisionally set transfer motion in the return operation RTN of the retainers 12. The output unit 38 displays the standard upper die interference curved surface and the operating curved surface which are placed in the three-dimensional coordinate system on a display (not illustrated), outputs a control signal based on the set pressing motion to the servo press control device 21, and outputs a control signal based on the set transfer motion to the servo transfer control device 25. Note that the processing in each unit of the transfer press control device 30 will be described in detail in a motion setting method.

Figure 6:
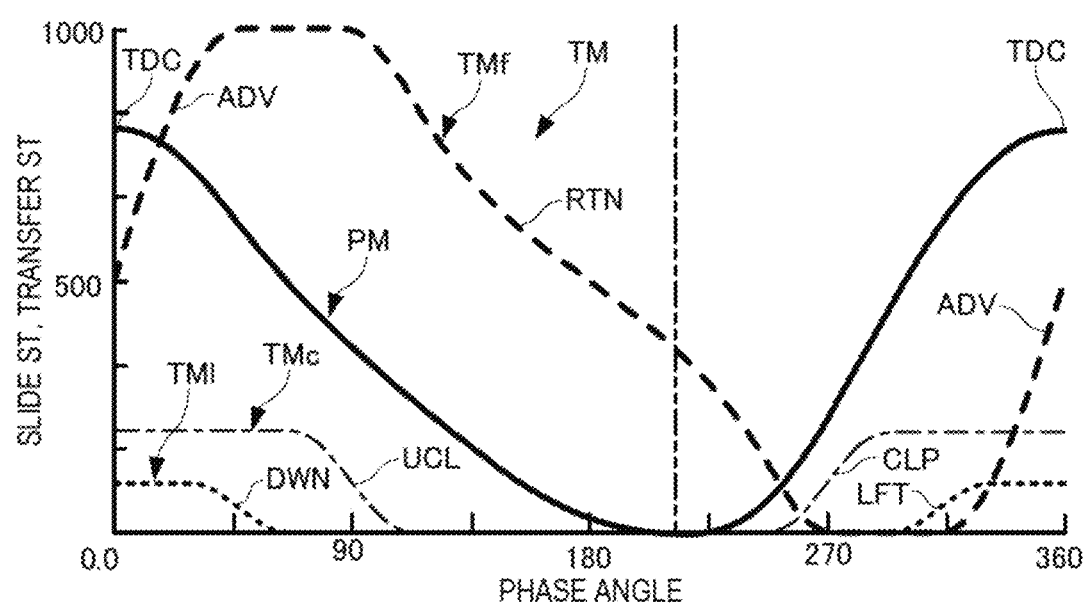
FIG. 6 is a diagram illustrating provisionally set pressing motion and provisionally set transfer motion.

The standard pressing motion BPM illustrated in (A) of FIG. 2 and the standard transfer motion BTM illustrated in (B) of FIG. 2 are reference motions that are uniquely set for each transfer press 1 and provided to customers. The transfer press 1 may operate without interfering with the upper die 7 and the retainers 12, in accordance with the standard pressing motion BPM and the standard transfer motion BTM. The standard pressing motion BPM and the standard transfer motion BTM are set corresponding to the same phase angle. In FIG. 2, the standard pressing motion BPM and the standard transfer motion BTM are divided into graphs (A) and (B) for easy viewing, but as illustrated in FIG. 6, and the like described later, they may be represented collectively in one graph. The phase angle is an angle obtained by allocating, by 360 degrees, one cycle from the slide 6 descending from a top dead center TDC to returning to the top dead center TDC. The phase angle may be a time axis of one cycle starting from the top dead center TDC of the standard pressing motion BPM.

The standard pressing motion BPM in (A) of FIG. 2 is, for example, a motion in which the servo motor 4 of the press machine 2 rotates at an equal speed to move the slide 6 up and down. The standard transfer motion BTM in (B) of FIG. 2 is represented by three curves consisting of standard feed motion BTMf, standard clamping motion BTMc, and standard lift motion BTMl of the transport device 10. Note that the clamping operation CLP, the lift operation LFT, the advance operation ADV, the down operation DWN, the unclamped operation UCL, and the return operation RTN in FIG. 2 correspond to each operation indicated by the arrows in FIG. 1.

The standard upper die interference curve BDGf illustrated in (A) of FIG. 3 is a line diagram in which a feed stroke (hereinafter referred to "feed ST") of the standard transfer motion BTM is taken as a horizontal axis and a distance obtained by subtracting a lift stroke (hereinafter referred to "lift ST") of the standard transfer motion BTM from the slide stroke (hereinafter referred to "slide ST") of the standard pressing motion BPM is taken as a vertical axis. The slide ST may be a stroke of the standard upper die attached to the slide 6.

The standard upper die interference curve BDGc illustrated in (B) of FIG. 3 is a line diagram in which a clamp stroke (hereinafter "clamp ST") of the standard transfer motion BTM is taken as a horizontal axis, and the vertical axis is the same as that of (A) of FIG. 3.

The standard upper die interference curve BDGf and the standard upper die interference curve BDGc are line diagrams expressed by a relative distance of the retainer 12 to the standard upper die attached to the slide 6 operating in accordance with the standard pressing ration BPM and the standard transfer motion BTM at the same phase angle. The standard upper die is the upper die 7 having the largest design size that can be attached to the press machine 2. The standard upper die interference curve BDGf illustrated in (A) of FIG. 3 represents how the retainer 12 on the right side of FIG. 1 follows any two dimensional trajectory with respect to the slide 6 and the upper die 7 when viewed from the front face (the opposite direction of the Y-axis) of the press machine 2. The standard upper die interference curve BDGc illustrated in (B) of FIG. 3 represents how the retainer 12 on the right side of the press machine 2 in FIG. 1 follows any two dimensional trajectory with respect to the slide 6 and the upper die 7 when viewed from the opposite direction of the X-axis. Here, the standard upper die interference curve BDGc of the retainer 12 on the right side is illustrated, while inverting the left and right sides of the standard upper die interference curve BDGc results in a standard upper die interference curve BDGc of the retainer 12 on the left side. With reference to FIG. 2, when the slide 6 is located at the top dead center TDC with a phase angle of 0 degrees, the retainer 12 is located at a position furthest away from the slide 6 (a position where the slide ST-lift ST in FIG. 3 is the maximum value), while when the slide 6 is at a bottom dead center with a phase angle of 180 degrees, the retainer 12 is located at a position closest to the standard upper die attached to the slide 6 (a position where the slide ST-lift ST in FIG. 3 is the minimum value).

A region surrounded by the standard upper die interference curve BDGf in (A) of FIG. 3 (a range indicated by diagonal lines) is the interference region, and a region on the right side of the standard upper die interference curve BDGc in (B) of FIG. 3 (a range indicated by diagonal lines) is the interference region. A die designer shall design a die such that the die fits within the interference region.

The standard upper die interference curve BDG illustrated in FIG. 4 is arranged in the same three-dimensional coordinate system in which the standard upper die interference curve BDGf and standard upper die interference curve BDGc illustrated in (A) and (B) of FIG. 3 are combined and three-dimensionally structured. Thus, the standard upper die interference curved surface 60 appears the same as in (A) of FIG. 3 when viewed from the Y-axis direction, and appears the same as in (B) of FIG. 3 when viewed from the opposite direction of the X-axis. The standard upper die interference curved surface 60 is formed between the standard upper die interference curve BDG and a reference plane 62. The reference plane 62 is a plane parallel to the X-Z plane at the value of the maximum clamp ST of the Y-axis. The interference region in the standard upper die interference curve BDGf and the standard upper die interference curve BDGc may be represented by a space formed between the standard upper die interference curved surface 60 and the reference plane 62. This space is the interference region, and the die fits in this space.

2. Motion Setting Method for Transfer Press

Figure 5:
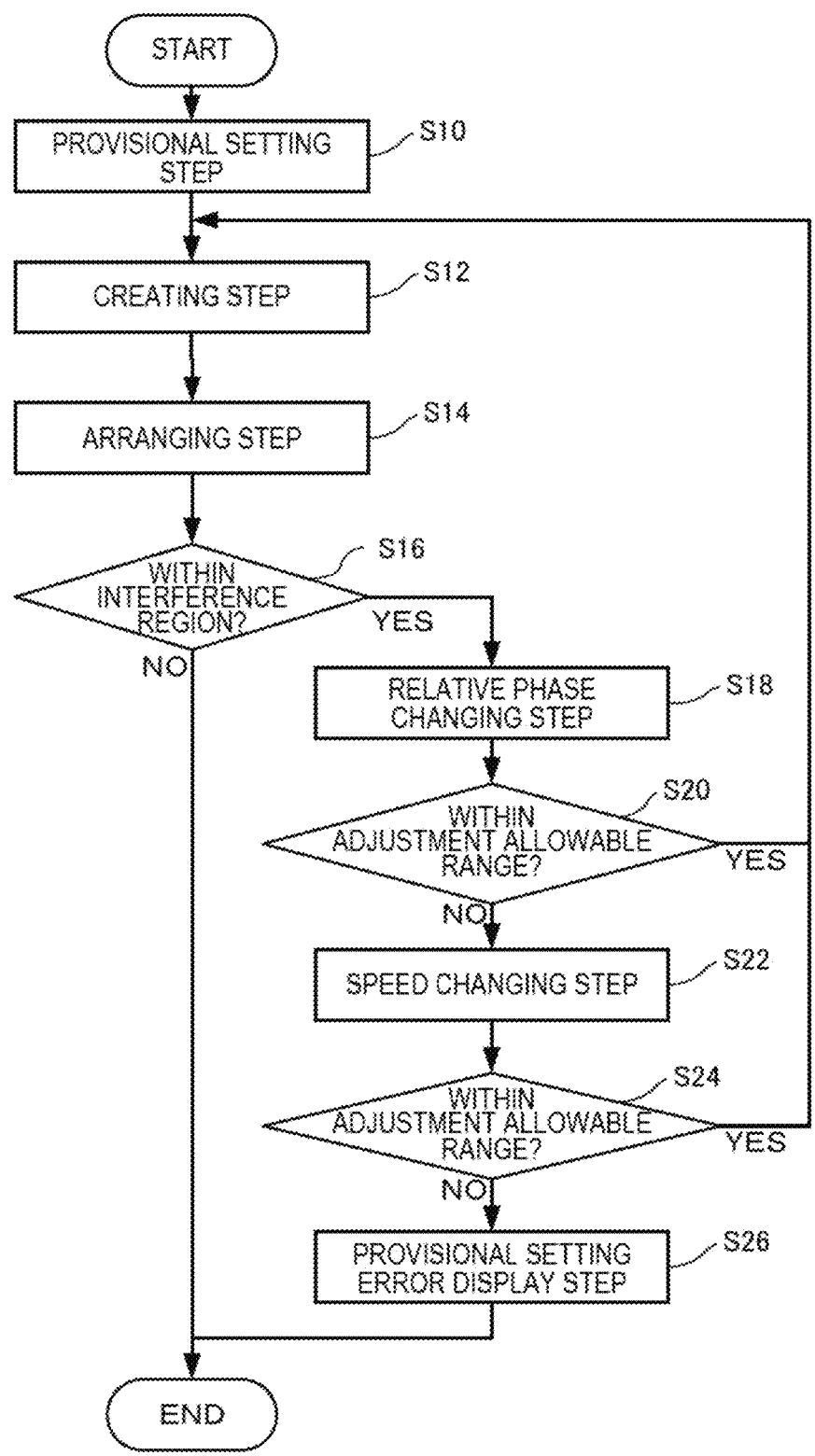
FIG. 5 is a flowchart of a motion setting method for a transfer press according to an embodiment of the invention.
Figure 7:
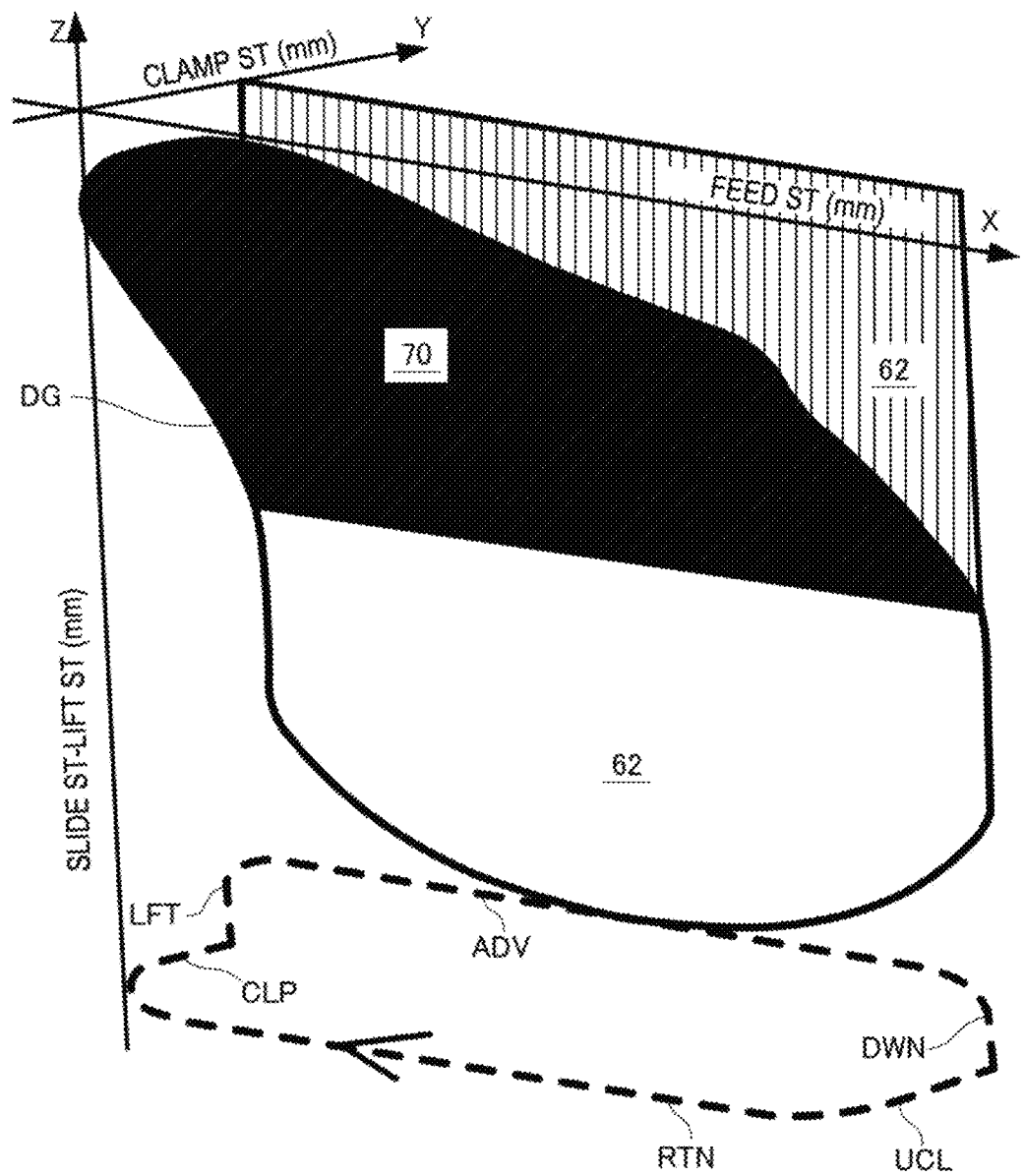
FIG. 7 is a provisionally set operating curved surface.
Figure 8:
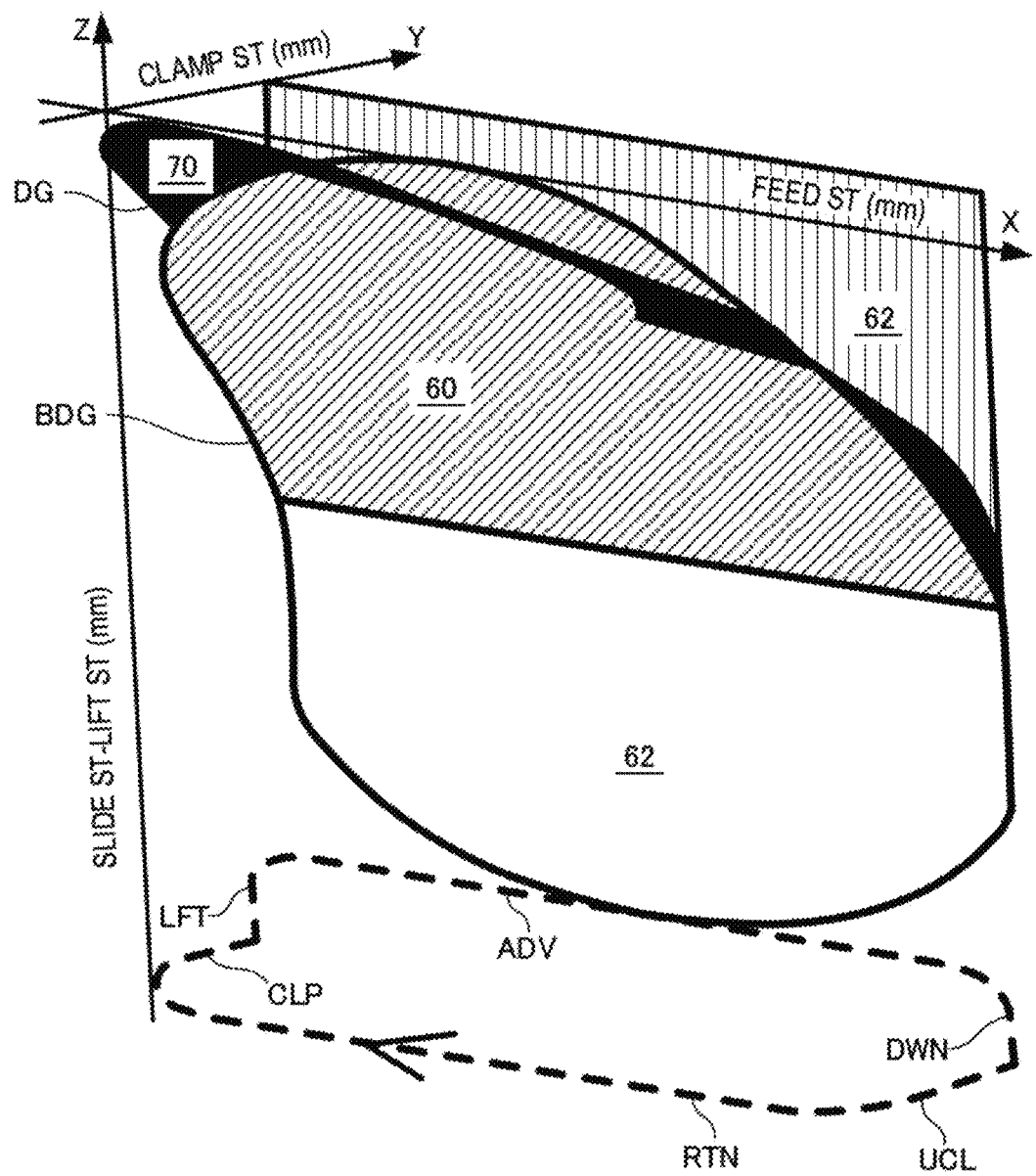
FIG. 8 is a diagram illustrating a determining step.
Figure 9:
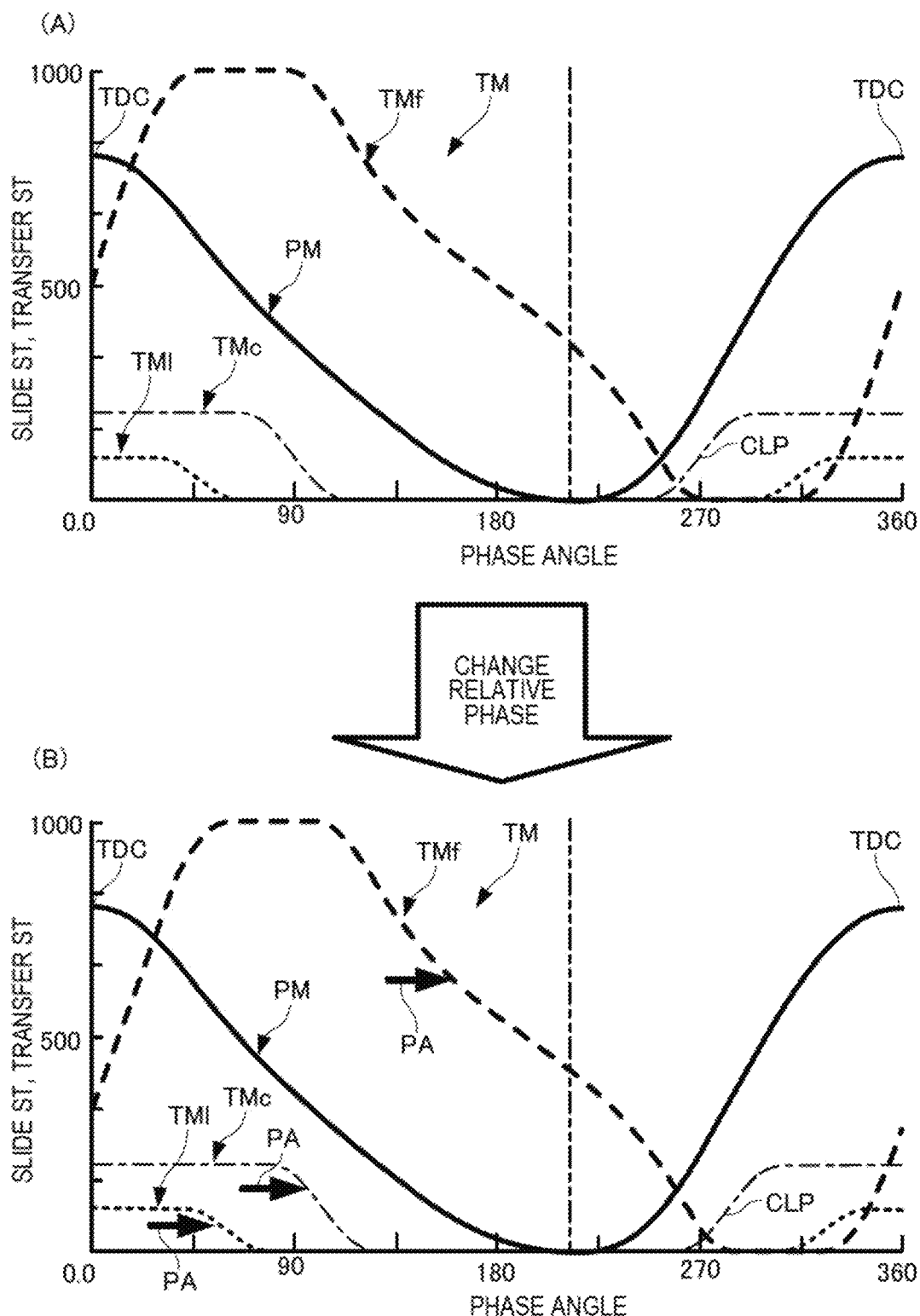
FIG. 9 is a diagram illustrating a relative phase changing step.
Figure 10:
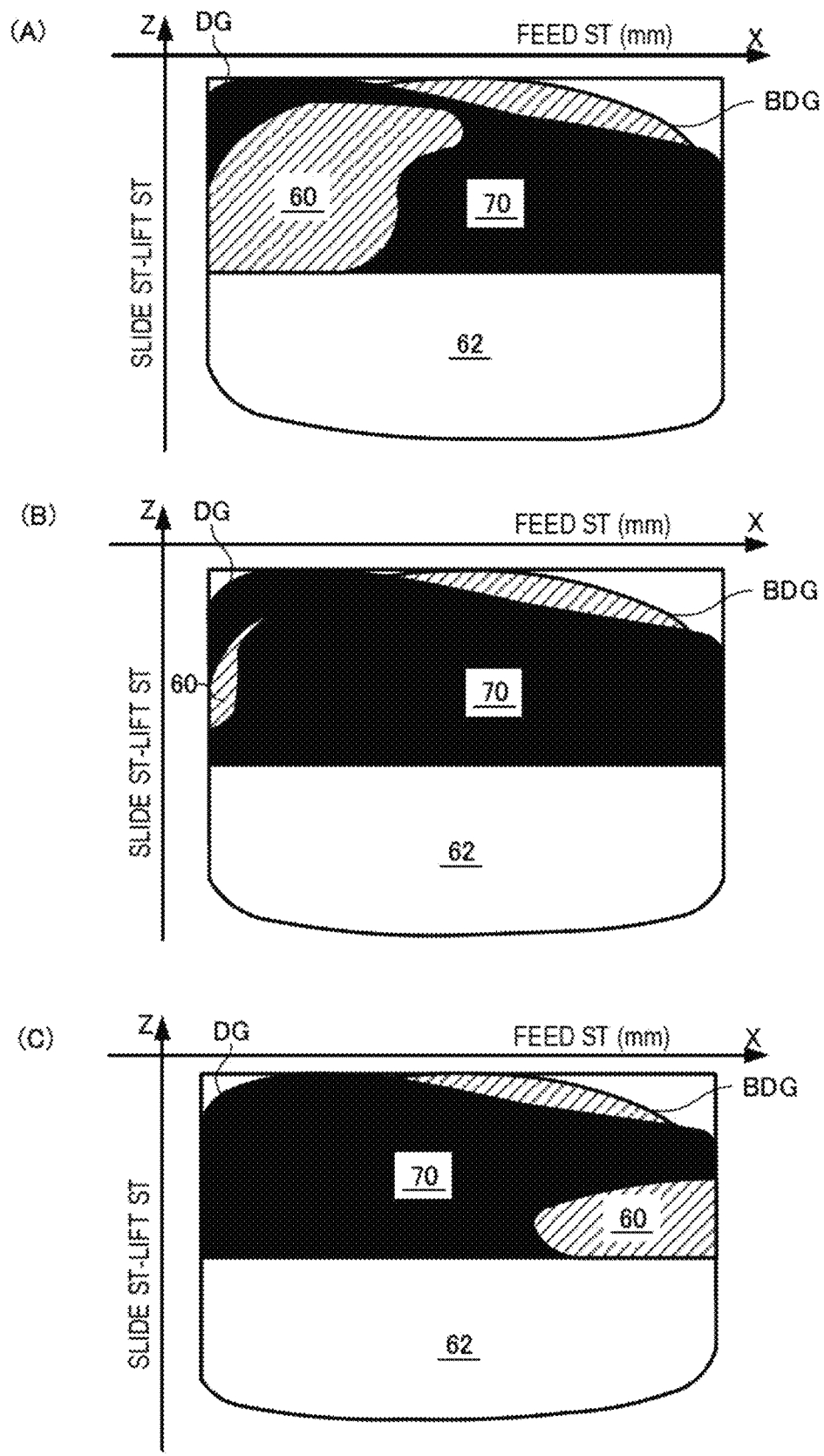
FIG. 10 is a diagram illustrating a relative phase changing step.
Figure 11:
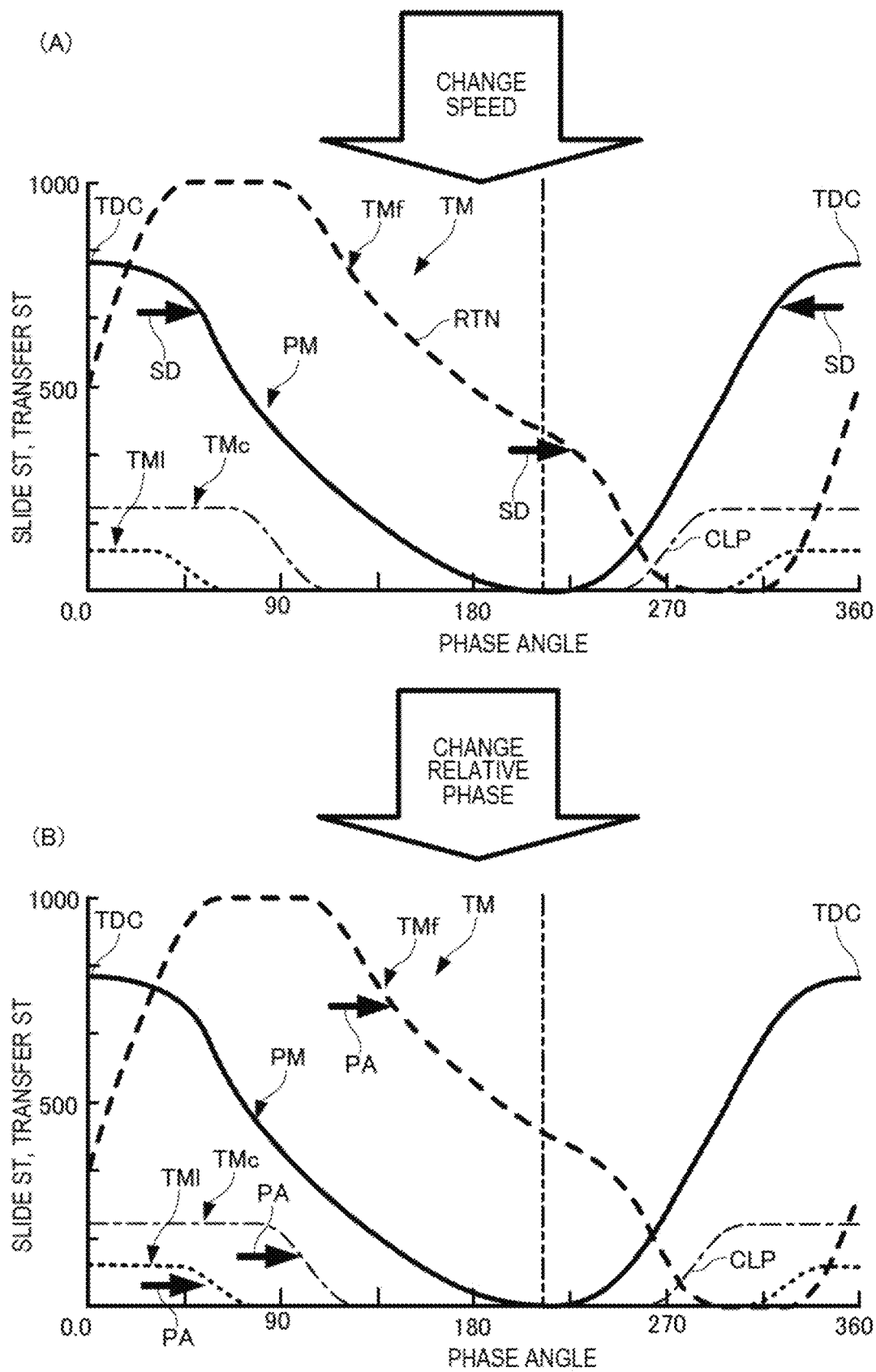
FIG. 11 is a diagram illustrating a speed changing step and a relative phase changing step.
Figure 12:
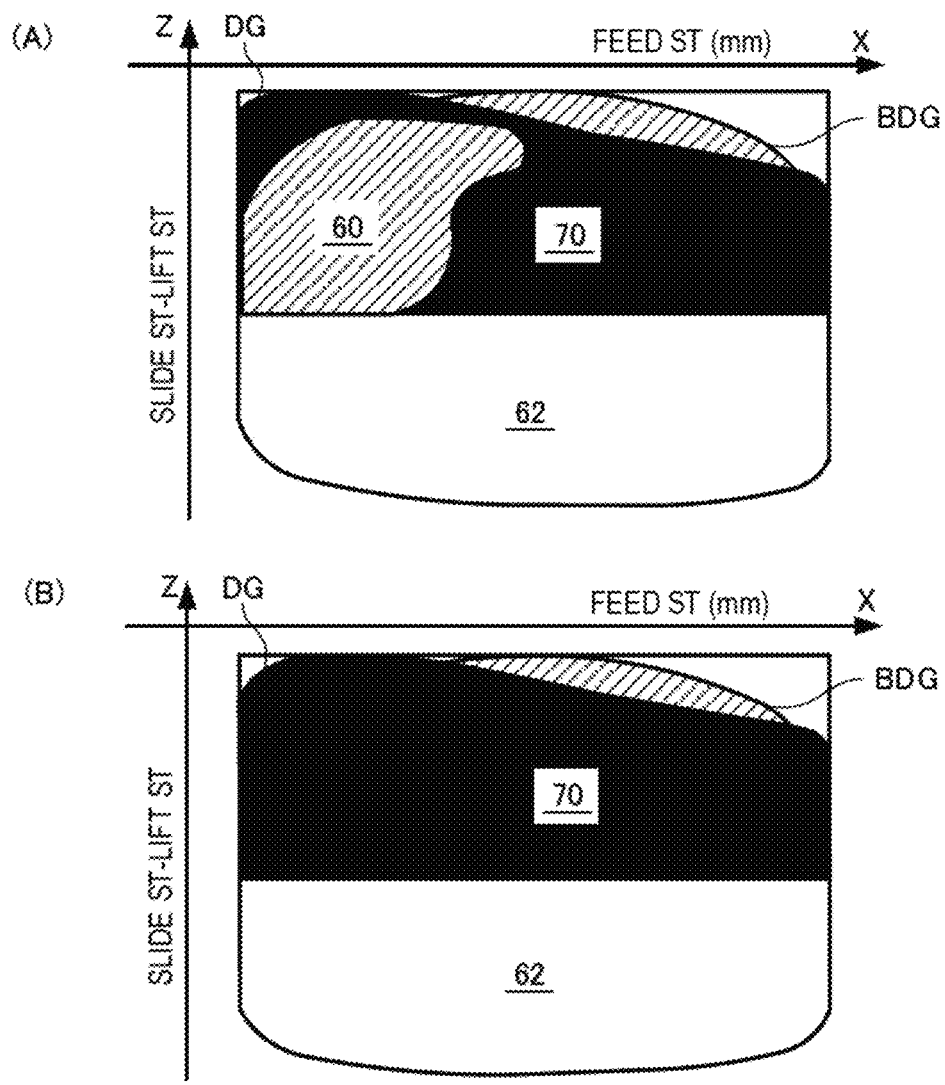
FIG. 12 is a diagram illustrating a speed changing step and a relative phase changing step.

The motion setting method for the transfer press 1 will be described in detail using FIG. 1 and FIGS. 4 to 12. FIG. 5 is a flowchart of a motion setting method for the transfer press 1 in accordance with an embodiment of the invention. FIG. 6 is provisionally set pressing motion PM and a provisionally set transfer motion TM. FIG. 7 is provisionally set operating curved surface 70. FIG. 8 is a diagram illustrating a determining step (S16). FIG. 9 is a diagram illustrating a relative phase changing step (S18). FIG. 10 is a diagram illustrating the relative phase changing step (S18) FIG. 11 is a diagram illustrating a speed changing step (S22) and the relative phase changing step (S18). FIG. 12 is a diagram illustrating the speed changing step (S22) and the relative phase changing step (S18).

As illustrated in FIG. 5, the motion setting method for the transfer press 1 includes at least a creating step (S12), the determining step (S16), and the relative phase changing step (S18). Furthermore, as illustrated in FIG. 5, the motion setting method may include a provisionally setting step (S10), an arranging step (S14), a first range determining step (S20), a speed changing step (S22), a second range determining step (S24), and a provisionally setting error display step (S26). Each step is described sequentially below.

Provisionally setting step (S10): As illustrated in FIG. 6, the operator who performs setting on the motion of the transfer press 1 operates the operation unit 31 to provisionally set the pressing motion PM and the transfer motion TM suitable for products produced using the creation unit 32. Conventionally, the transfer motion TM is synchronized to the press crank angle, and therefore it is difficult to provisionally set two motions independently since adding deceleration operation to the pressing motion PM would also cause to add deceleration operation to the transfer, and extending a transport time would also cause to extend the processing time of the press. However, the present embodiment includes the determining steps (S16) and the relative phase changing step (S18) described below, such that two motions can be independently set.

Specifically, the pressing motion PM is provisionally set in consideration of moldability such as SPM (Shots Per Minute), the number of steps, etc. For example, when high-speed productivity is emphasized, the pressing motion PM is provisionally set to operate at the maximum SPM in the press machine 2, and when precision of products is emphasized, the pressing motion PM including complicated acceleration/deceleration operation is provisionally set. At this time, the effects on the transfer motion TM need not be considered. In the example of FIG. 6, the pressing motion PM is provisionally set such that, during the lowering movement of the slide 6, the deceleration operation is added to reach the bottom dead center at an angle higher than position of the phase angle of 180 degrees.

Furthermore, the transfer motion TM is provisionally set with transport efficiency emphasized. For example, the transfer motion TM is provisionally set to ensure the maximum transport efficiency in the transport device 10 while keeping the maximum speed and the maximum acceleration allowed by the transport device 10 using the amount of each axial stroke, the amount of wrap, and the like. At this time, the effects on the pressing motion PM need not be considered.

Creating step (S12): As illustrated in FIG. 7, the creation unit 32 creates, based on the provisionally set pressing motion PM and the provisionally set transfer motion TM in FIG. 6, the three-dimensional operating curved surface 70 based on the relative distance of the retainers 12 with respect to the slide 6. Similar to the standard upper die interference curved surface 60 described using FIG. 4, the operating curved surface 70 is a surface formed between an operating curve DG and the reference plane 62. The operating curved surface 70 is a surface formed by arranging, in a small section in the Z-axis direction, an imaginary straight line extending along the X-axis direction with both ends thereof coinciding with the operating curve DG. The operating curve DG is a line diagram in which the pressing motion PM and the transfer motion TM are represented in the three-dimensional coordinate system with the phase angles thereof are matched. In the three-dimensional coordinate system, the feed ST is taken as the X-axis, the clamp ST is taken as the Y-axis, and the distance obtained by subtracting the lift ST from the slide ST is taken as the Z-axis. Below the operating curve DG, the movement trajectory of the retainer 12 is illustrated in dashed lines to assist in understanding the operating curve DG, but may not be displayed. By looking at the operating curve DG, the relative distance between the standard upper die attached to the slide 6 and the retainer 12 when the retainer 12 is at any point on the dashed line can be found. For example, in the advance operation ADV, it can be found that the relative distance varies on the outer circumference of the reference surface 62, and in the unclamped operation UCL, the return operation RTN, and the clamping operation CLP, it can be also found that the relative distance varies on the outer circumference of the operating curved surface 70.

Arranging step (S14): As illustrated in FIG. 8, the creation unit 32 arranges the standard upper die interference curved surface 60 of FIG. 4 in which the standard upper die interference curves BDGf, BDGc are three-dimensionally structured, and the operating curved surface 70 of FIG. 7 in the same three-dimensional coordinate system. The arranging step (S14) may be performed in the next determining step (S16).

Determining step (S16): The determination unit 34 compares the standard upper die interference curved surface 60 with the operating curved surface 70 arranged in the same three-dimensional coordinate system to determine whether the operating curved surface 70 is present within the interference region of the standard upper die interference curved surface 60. The interference region is a region sandwiched between the standard upper die interference curved surface 60 and the reference surface 62. In FIG. 8, since a portion of the standard upper die interference curved surface 60 is positioned in front of the operating curved surface 70 in the Y-axis direction, it is determined that a portion of the operating curved surface 70 that is hidden and not visible behind the standard upper die interference curved surface 60 is present within the interference region. When the interference region is represented by the two-dimensional coordinate system illustrated in (B) of FIG. 3 as in the related art, it is determined to have the interference when the motion is set in the interference region. However, by using the three-dimensional standard upper die interference curved surface 60 as in FIG. 4, the presence or absence of the interference can be determined along the feed ST, which results in more accurate determination. Thus, even the motion, which has been determined to have the interference in the two-dimensional coordinate system in the related art, may be determined to have no interference by determining in the three-dimensional coordinate system, and thus higher production efficiency can be achieved.

When it is determined in the determining step (S16) that the operating curved surface 70 is present within the interference region ("yes" in FIG. 5), the relative phase changing step (S18) is performed.

When it is determined in the determining step (S16) that the operating curved surface 70 is not present within the interference region ("no" in FIG. 5), the processing of the motion setting method is terminated, and the provisionally set pressing motion PM and the provisionally set transfer motion TM are set as each motion of the transfer press 1.

Relative phase changing step (S18): The phase adjustment unit 35 changes the relative phase of the transfer motion TM with respect to the pressing motion PM when determining in the determining step (S16) that the operating curved surface 70 is present within the interference region. For example, (A) of FIG. 9 is the same as the motion line diagram in FIG. 6, however, after changing the relative phase, as illustrated in (B) of FIG. 9, the transfer motion TM is moved to the right side of the diagram by a unit phase angle with the phase angle of the pressing motion PM being fixed. In (A) of FIG. 9, the start point of the clamping operation CLP causes the interference near the bottom dead center of the slide 6, while in (B) of FIG. 9, the start point of the clamping operation CLP is separated from the bottom dead center of the slide 6, thereby avoiding the interference without reducing the SPM. The unit phase angle moved by one relative phase changing step (S18) is set to a preset angle in advance. In the relative phase changing step (S18), the motion itself is not changed. Therefore, the interference can be avoided by the phase adjustment unit 35 using the three-dimensional coordinate system without reducing the SPM as much as possible, thereby the production efficiency can be improved. Note that although the unit phase angle is changed here, a unit phase time may be changed in a case where the motion is provisionally set on the phase time axis of one cycle.

First range determining step (S20): The phase adjustment unit 35 determines whether the phase angle is present within the adjustment allowable range after the relative phase changing step (S18). This determination may be performed by the determination unit 34. The adjustment allowable range is preset as a range of phase angles that can be changed in the relative phase changing step (S18), for example, a range not exceeding ±180 degrees. The relative phase changing step (S18) and the determining step (S16) can be each repeated a plurality of times within the relative phase adjustment allowable range ("yes" in S20 in FIG. 5). By repeating a plurality of times, the interference can be eliminated without changing both motions desired by the operator. Note that the adjustment allowable range may be set as the number of repetitions of the relative phase changing step (S18).

In the present embodiment, when it is determined to be present within the adjustment allowable range in the first range determining step (S20) after the relative phase changing step (S18), the creating step (S12), the arranging step (S14), the determining step (S16), the relative phase changing step (S18), and the first range determining step (S20) are again performed sequentially. Specifically, the creating step (S12) creates the operating curved surface 70 having the relative phase changed in the relative phase changing step (S18), the arranging step (S14) arranges the standard upper die interference curved surface 60 and the operating curved surface 70 having the relative phase changed in the same three-dimensional coordinate system, and the determining step (S16) compares both of the curved surfaces.

In FIG. 10, two relative phase changing steps (S18) are repeated to change the relative phase. FIG. 10 illustrates a state in which the standard upper die interference curved surface 60 and the operating curved surface 70 arranged in the three-dimensional coordinate system are viewed along the Y-axis. In (A) of FIG. 10, the standard upper die interference curved surface 60 is visible in a wide range in front of the operating curved surface 70 near the clamping operation CLP, while in (B) of FIG. 10 where the relative phase has been changed once, the area where the standard upper die interference curved surface 60 is visible is narrow. Furthermore, in (C) of FIG. 10 where the relative phase has been changed twice, it can be found that the region where the standard upper die interference curved surface 60 is visible has moved to the latter half of the feed ST (on the unclamped operation UCL side), while the interference is not eliminated since the standard upper die interference curved surface 60 is visible. Note that FIG. 10 does not correspond to FIG. 9.

In this manner, when the relative phase changing step (S18) is repeated, and it is not determined to be present within the adjustment allowable range in the first range determining step (S20) ("no" in S20 in FIG. 5), the speed changing step (S22) is performed.

Speed changing step (S22): When the relative phase in the relative phase changing step (S18) exceeds the adjustment allowable range ("no" in S20 in FIG. 5), the slide deceleration adjustment unit 36 returns the relative phase to the provisionally set state and adjusts provisionally set pressing motion PM to decelerate near the upper motion limit of the slide 6. The upper motion limit may be the top dead center TDC of the slide 6. In the example of FIG. 11, the relative phase is first returned to the provisionally set state, that is, the state illustrated in (A) of FIG. 9, and then the deceleration operation SD is added near the top dead center TDC of the slide 6 in the pressing motion PM. The deceleration operation SD in the pressing motion PM further decelerates the lowering speed and the raising speed of the slide 6 than the state of (A) of FIG. 9, thereby the time at which the slide 6 waits near the top dead center TDC (hereinafter referred to as the "slide standby time") can be lengthened, which makes the interference easier to be eliminated. The slide standby time in one deceleration operation SD is preset.

Further, in the speed changing step (S22), when the relative phase in the relative phase changing step (S18) exceeds the adjustment allowable range ("no" in S20 in FIG. 5), the retainer deceleration adjustment unit 37 returns the relative phase to the provisionally set state, and performs the adjustment to decelerate the provisionally set the transfer motion TM in the return operation RTN of the retainer 12. In the example of (A) of FIG. 11, the deceleration operation SD is added near the end of the return operation RTN of the transfer motion TM. Adding the deceleration operation SD in the return operation RTN can increase the time until the retainer 12 enters the interference region (hereinafter referred to as the "retainer standby time"), which makes the interference easier to be eliminated. The retainer standby time in one deceleration operation SD is preset.

Second range determining step (S24): The slide deceleration adjustment unit 36 and the retainer deceleration adjustment unit 37 determine whether the slide standby time and the retainer standby time are present within the adjustment allowable range after the speed changing step (S22). This determination may be performed by the determination unit 34. The adjustment allowable range is preset as the range of each standby time that can be changed in the speed changing step (S22). In a case where each standby time in the second range determining step (S24) is present within the adjustment allowable range ("yes" in S24 in FIG. 5), then the creating step (S12), the arranging step (S14), and the determining step (S16) are performed again. In a case where it is determined to have the interference ("yes" in S16 in FIG. 5), the relative phase changing step (S18) is performed. After setting the slide standby time and the retainer standby time in accordance with the speed changing step (S22) in (A) of FIG. 11, the relative phase changing step (S18) is further performed in (B) of FIG. 11. As a result, the starting point of the clamping operation CLP is separated from the bottom dead center, which makes the interference to be eliminated. By performing the relative phase changing step (S18) after the speed changing step (S22) in this manner, the interference can be avoided while suppressing a decrease in the production efficiency due to the deceleration.

In addition, in a case where each standby time in the second range determining step (S24) is not present within the adjustment allowable range ("no" in S24 in FIG. 5), the provisionally setting error display step (S26) is performed. The provisionally setting error display step (S26) performs an error indication at the output unit 38 to prompt the operator to change the provisionally set pressing motion PM and the provisionally set transfer motion TM.

In the example illustrated in FIG. 12, the speed changing step (S22) is performed to set the standby time from the state of being returned to the provisionally setting, and further the relative phase changing step (S18) at a first time is performed to obtain the state of (A). In (A) of FIG. 12, the operating curved surface 70 is still present within the interference region, such that the relative phase changing step (S18) at a second time is further performed, and thus the standard upper die interference curved surface 60 is not present in front of the operating curved surface 70 as in (B). Note that, in FIG. 12, for convenience of explanation, it is not clear that the operating curved surface 70 is not present within the interference region since it is viewed from the front in the Y-axis direction while by displaying in three dimensions as illustrated in FIG. 8, it can be found that the operating curved surface 70 is not present between the standard upper die interference curved surface 60 and the reference surface 62. In the state of (B) of FIG. 12, it is determined to have no interference in the determining step S16 ("yes" in S16 in FIG. 5), and thus the motion setting is terminated.

The speed changing step (S22) and the second range determining step (S24) can be each repeated a plurality of times within an adjustment allowable range for each standby time. In this manner, by performing the relative phase changing step (S18) each time the speed changing step (S22) is repeated by reducing the amount of deceleration, the interference can be avoided while suppressing the SPM reduction, thereby the high production efficiency can be achieved.

In the above-described embodiment, the operation in which the crankshaft of the press machine 1 rotates once in the pressing motion PM has been described. However, the invention is not limited thereto, and the pressing motion PM may also correspond to a pendulum operation, a double stroke operation, and the like.

The invention is not limited to the above-described embodiments, and various modifications can be made. The invention includes configurations that are substantially the same (in function, method, and results, or in objective and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. A motion setting method for a transfer press including a press machine configured to move a slide up and down in accordance with pressing motion, and a transport device configured to move a retainer in accordance with transfer motion to transport a workpiece, the motion setting method comprising the steps of:
    creating, based on the pressing motion provisionally set and the transfer motion provisionally set, an operating curved surface which has been made three-dimensional based on a relative distance of the retainer relative to a standard upper die attached to the slide;
    determining, by comparing a standard upper die interference curved surface with the operating curved surface that are placed in a same three-dimensional coordinate system, whether the operating curved surface is present within an interference region of the standard upper die interference curved surface, the standard upper die interference curved surface having been obtained by making a standard upper die interference curve three-dimensional; and
    when the operating curved surface is determined to be present within the interference region in the determining step, changing a relative phase of the transfer motion relative to the pressing motion,
    after the changing step, the determining step being performed again by comparing the standard upper die interference curved surface with the operating curved surface having the relative phase changed.

2. The motion setting method for a transfer press according to claim 1, wherein
    each of the changing step and the determining step is repeated two or more times within an adjustment allowable range of the relative phase.

3. The motion setting method for a transfer press according to claim 2, wherein
    when the relative phase in the changing step exceeds the adjustment allowable range, the determining step and the changing step are performed after returning the state of the relative phase to a provisionally set state and performing adjustment for decelerating the provisionally set pressing motion when reaching a vicinity of an upper motion limit of the slide.

4. The motion setting method for a transfer press according to claim 2, wherein
when the relative phase in the changing step exceeds the adjustment allowable range, the determining step and the changing step are performed after returning the state of the relative phase to a provisionally set state and performing adjustment for decelerating the provisionally set transfer motion in a return operation of the retainer.

5. The motion setting method for a transfer press according to claim 3, wherein
when the relative phase in the changing step exceeds the adjustment allowable range, the determining step and the changing step are performed after returning the state of the relative phase to a provisionally set state and performing adjustment for decelerating the provisionally set transfer motion in a return operation of the retainer.

6. A transfer press comprising:
a press machine configured to move a slide up and down in accord ice with pressing motion;
a transport device configured to move a retainer in accordance with transfer motion to transport a workpiece; and
a control device,
the control device being configured to:
create, based on the pressing motion provisionally set and the transfer motion provisionally set, an operating curved surface which has been made three-dimensional based on a relative distance of the retainer relative to a standard upper die attached to the slide;
determine, by placing a standard upper die interference curved surface and the operating curved surface in a same three-dimensional coordinate system, whether the operating curved surface is present within an interference region of the standard upper die interference curved surface, the standard upper die interference curved surface having been obtained by making a standard upper die interference curve three-dimensional; and
when the operating curved surface is present within the interference region, changing a relative phase of the transfer motion relative to the pressing motion.

7. The transfer press according to claim 6, wherein
when the operating curved surface is present within the interference region, the control device is configured to decelerate the provisionally set pressing motion when reaching a vicinity of an tipper motion limit of the slide.

8. The transfer press according to claim 6, wherein
when the operating curved surface is present within the interference region, the control device is configured to decelerate the provisionally set transfer motion in a return operation of the retainer.

9. The transfer press according to claim 7, wherein
when the operating curved surface is present within the interference region, the control device is configured to decelerate the provisionally set transfer motion in a return operation of the retainer.

* * * * *